United States Patent [19]

Wagener et al.

[11] 4,017,372
[45] Apr. 12, 1977

[54] PROCESS FOR ELECTRODEPOSITION OF CROSS-LINKED POLYMER COATINGS

[75] Inventors: Earl H. Wagener, Concord, Calif.; Ritchie A. Wessling; Dale S. Gibbs, both of Midland, Mich.

[73] Assignee: The Dow Chemical Company, Midland, Mich.

[22] Filed: Apr. 21, 1975

[21] Appl. No.: 569,722

[52] U.S. Cl. ............................................. 204/181
[51] Int. Cl.² ....................................... C25D 13/06
[58] Field of Search .................................. 204/181

[56] References Cited
UNITED STATES PATENTS

| | | | |
|---|---|---|---|
| 3,645,872 | 2/1972 | Weigel | 204/181 |
| 3,761,371 | 9/1973 | Dickie et al. | 204/181 |

*Primary Examiner*—Howard S. Williams
*Attorney, Agent, or Firm*—I. A. Murphy

[57] ABSTRACT

A method for electrodeposition of an adherent, water-resistant, cross-linked, organic coating on an electroconductive surface comprising (a) placing the elecroconductive surface to be coated in contact with an aqueous dispersion containing a water-insoluble, essentially electrically non-conductive, film-forming, organic polymer as cation-active, structured particles wherein a substantial portion of the cation-activity is provided by pH independent cationic groups which are chemically bound to the polymer at or near the particle surface and (b) passing an electric current from an electrode through the latex to the electroconductive surface in such a direction that the electroconductive surface is negatively charged, i.e., becomes a cathode in an electrophoretic cell. By use of alternating current both electrodes become coated with an adherent coating of polymer.

10 Claims, No Drawings

PROCESS FOR ELECTRODEPOSITION OF CROSS-LINKED POLYMER COATINGS

BACKGROUND OF THE INVENTION

1. Field of the Invention

The invention is concerned with electrodeposition of polymers in aqueous dispersion onto conductive surfaces to form cross-linked coatings wherein the article which comprises such surfaces is the cathode in an electric current carrying loop.

2. Description of the Prior Art

U.S. Pat. No. 3,697,398 describes a process for electrodepositing water soluble sulfonium polymers. However, in that patent there is no disclosure of the electrodeposition of polymers of sufficiently high molecular weight and low charge desnity to be water insoluble. The electrodeposition of other polymers in a water soluble form, i.e., water soluble, cationic epoxy resins, is described in U.S. Pat. No. 3,793,278. Cathodic electrodeposition of aqueous dispersions of material stabilized by amine and ammonium type surfactants is described in U.S. Pat. No. 3,159,558.

Another application of the present applicants, Ser. No. 430,105 filed Jan. 2, 1974, now U.S. Pat. No. 3,873,488, describes aqueous dispersions of water insoluble polymers stabilized with sulfonium cations which are suitable for cathodic electrodeposition. There is no suggestion in that application of structured-particle latexes.

One of the problems of the art is that in order to form smooth coatings it is necessary that a coating material must be sufficiently soft to permit some flow yet the coated material must have appropriate properties for the intended use. Accordingly, it would be desirable to have compositions and methods by which coatings could be readily cross-linked at appropriate times to provide articles having coatings of desired properties. It would be especially desirable if such a process were available which did not require the addition of curing agents and/or further process steps.

SUMMARY OF THE INVENTION

In accordance with the present invention, there is provided a method of electrodeposition from aqueous colloidal dispersions of cation-active particles in an electrophoretic cell which comprises a coating bath and electrodes which constitute a cathode and at least one anode whereby an adherent, hydrophobic, cross-linked coating of polymer is applied to an object having an electroconductive surface by the steps of immersing the object to be coated into the coating bath comprising the aqueous dispersion of cationic particles, connecting a source of electric potential to the object to be coated as one electrode and to at least one other electrode in electrical contact with the coating bath, passing an electric current through the aqueous dispersion comprising the coating bath in such a direction that the electroconductive surface of the object to be coated becomes negatively charged and the other electrodes become positively charged. The aqueous dispersion comprising the cation-active polymer particles during the process has a conductivity of from about 300 micromhos to about 3500 micromhos per centimeter, preferably from about 600 to about 1800 micromhos per centimeter, and the polymer to be electrodeposited comprising the dispersed particles is a water-insoluble, essentially electrically non-conductive, film-forming, organic polymer wherein a substantial portion, especially one-half or greater, of the cation-activity is provided by pH independent cations which are chemically bound to the polymer at or near the particle surface. The present method provides electrodeposition with simultaneous cross-linking and reduces or eliminates the need for additional curing. The structured-particles required in the practice of the method provide a means for independently controlling the colloidal stability of the aqueous dispersions, the thickness of the electrodeposited coating and the degree of cross-linking of the polymer.

Direct or alternating current may be used in the electrodeposition. Some of the hydrophilic character of the polymer due to the cationic groups is destroyed electrolytically during the deposition and at least most of the then remaining cationic groups may be destroyed by subsequent heating.

DESCRIPTION OF THE PREFERRED EMBODIMENTS

The practice of the present invention requires an electroconductive surface to be coated, a source of electric current, an electrode to function as an anode and an aqueous dispersion of a water-insoluble, essentially electrically non-conductive, film-forming, organic polymer as cation-active, structured particles in which the cation activity is provided primarily by pH independent cations which are chemically bound to the polymer at or near the particle surface.

A wide variety of aqueous dispersions of water-insoluble, essentially electrically non-conductive polymers are suitable for the practice of this invention.

One way in which the structured particles required for the present method may be obtained is by direct emulsion copolymerization of an ethylenically unsaturated, activated-halogen monomer and a nonionic, hydrophobic, ethylenically unsaturated monomer to provide a latex of particles of copolymer having activated-halogens uniformly or randomly placed throughout the copolymer. The resulting latexes then are reacted with a nonionic nucleophile which is capable of diffusing through aqueous media, the reaction being carried out under conditions selected such that only the activated-halogens at or near the surface of the particles react with the nucleophile. In a second method, the nucleophile can be reacted partially or completely with a structured-particle latex of copolymer particles consisting of a nonionic, organic polymer core having adhered thereto a thin layer of a water-insoluble copolymer of (a) an ethylenically unsaturated, nonionic monomer which is devoid of an activated-halogen and (b) a nonionic, ethylenically unsaturated, activated-halogen monomer. By whatever method, the resulting chemically bound cationic charge must be bound to the latex particle at or near the particle surface with substantially no ionic charge being in the interior of the particle. By the second method of obtaining the latex with cationic charges chemically bound at or near the particle surface, there are substantially no activated-halogens in the interior of the particle. For simplicity and brevity of identification in this specification, the latexes having activated-halogens at or near the particle surface but none in the interior are sometimes referred to as the active-halogen encapsulated latexes and the latexes having activated-halogens uniformly or randomly distributed throughout the particle are referred to as the activated-halogen copolymer latexes. After reaction with the nucleophile, either type of latex becomes a structured-particle latex having pH independent cationic charges chemically bound to the copolymer at or near the particle surface.

There are many known latexes which may serve as the starting latex to prepare the activated-halogen encapsulated latexes and the composition is not narrowly critical. Such starting latexes are prepared by processes well known in the art. Preformed latexes having substantially no residual monomers may be used but advantageously these starting latexes can be prepared by emulsion polymerization as the first step in the preparation of latex products wherein some monomer and some free-radicals remain at the time of addition of the activated-halogen monomer. The starting latex, or components and methods for making such latex, are selected from the known latex compositions which are substantially devoid of anionic groups and/or anionic surfactants adsorbed or otherwise attached to the polymer particles comprising the latex. Preferably the latex is slightly cationic, usually from the presence of a small amount of a cationic surfactant. For best results the starting latex should not contain an amount of a surfactant sufficient to initiate new particles when additional monomer is introduced. The composition of the polymeric component of the starting latex also does affect certain properties of the final product since it constitutes a major portion of the total mass of the product. Thus, a selection will be made somewhat according to the desired polymeric properties known to be possessed by these prior art materials to supplement the properties which are attributable to the encapsulating component of the invention. Thus, as an illustration but not a limitation, for the predominant portion of the products, a starting latex which is film-forming at room temperature will be selected but there are uses for which a non-film forming starting latex would be selected, such as for plastic pigments. Ordinarily the starting latexes have a particle size of from about 500 Angstroms to about 10,000 Angstroms, preferably from about 800 Angstroms to about 3000 Angstroms. If the products are to be used in a manner such as to require certain commonly recognized characteristics, for example, low electrolyte concentration, such characteristics will be considered when selecting the starting latex and the ingredients to be used in carrying out subsequent parts of the process. Such selections are within the skill of the art and are not considered inventive aspects of the novel compositions and method herein described.

Typically the starting latexes are obtained by emulsion polymerization of one or more monomers. Such monomers are represented by the same monomers listed below for copolymerization with the activated-halogen monomers.

The starting latexes for encapsulation also may consist essentially of polymers which are not prepared readily from monomers by emulsion polymerization, either because no substantial polymerization at a commercially acceptable rate is obtained under usual emulsion polymerization conditions, such as with isobutene, or because a particular form of the polymerized monomer is desired, for example stereospecific polyisoprene, stereospecific polybutadiene and the like. Representative pre-formed polymers are polymers and copolymers of the mono-olefins having from 2 to 20 carbon atoms such as ethylene, propylene, 1-butene, 2-butene, isobutene, pentene, hexene, octene, dodecene, hexadecene, octadecene, and especially those mono-olefins having up to 8 carbon atoms. Especially common types are the various ethylene/propylene copolymers.

Illustrative of still other polymers which may be constituents for the starting latex for encapsulation are alkyd resins, block and graft copolymers; e.g., styrene/butadiene graft and block copolymers; epoxy resins such as the reaction products of epichlorohydrin and bisphenol-A; and thermosettable vinyl ester resins; e.g., the reaction products of approximately equimolar amounts of a polyepoxide and an unsaturated monocarboxylic acid such as acrylic acid and methacrylic acid or unsaturated fatty acids such as oleic acid.

Methods for preparing the above described polymers and methods for converting the polymers to latexes are well known and are not a part of this invention.

In one method for obtaining a latex which is suitable for subsequent electrodeposition according to the method of this invention, the particles of a starting latex are encapsulated with a thin layer of a copolymer of an ethylenically unsaturated, activated-halogen monomer either by adding the activated-halogen monomer or a mixture of such monomers to the reaction mixture of the starting latex before all of the monomers are converted to polymer or by adding the activated-halogen monomer together with one or more hydrophobic monomers to the starting latex containing essentially no residual monomers, and initiating and continuing polymerization of the thus-added monomers to substantially complete conversion.

The activated-halogen monomers for either type of latex should be sufficiently activated to react at a reasonable rate after polymerization with subsequently added nucleophilic agents but should not be so reactive as to hydrolyze readily in an aqeuous medium. Such suitable monomers are represented by ethylenically unsaturated benzylic chloride or bromide monomers, ethylenically unsaturated aliphatic bromide monomers and ethylenically unsaturated aliphatic iodide monomers. Specific preferred activated-halogen monomers are represented by vinylbenzyl chloride, vinylbenzyl bromide, 2-chloromethylbutadiene, vinyl bromide and bromo-alkyl acrylate or bromoalkyl methacrylate esepeially 2-bromoethyl acrylate or 2-bromoethyl methacrylate.

The activted-halogen monomers are oil soluble, are easy to polymerize in emulsion, do not inhibit free radical polymerization and diffuse at a satisfactory rate through the aqueous medium of a latex to the latex particle.

The hydrophobic, ethylenically unsaturated monomer which may be copolymerized with the activated-halogen monomer may be selected from the known wide variety of non-ionic, ethylenically unsaturated monomers which are polymerizable in aqueous emulsion to form a water-insoluble polymer. These monomers are well-known in the art and hence are illustrated below only by representative examples. The non-ionic, ethylenically unsaturated monomers are represented by, but not restricted to, hydrocarbon monomers such as the styrene compounds, e.g., styrene, α-methylstyrene, ar-methylstyrene, ar-ethylstyrene, α,ar-dimethylstyrene, ar,ar-dimethylstyrene, and t-butylstyrene; the conjugated dienes, e.g., butadiene and isoprene; the hydrocarbon monomers which are modified to possess non-ionic substituents, e.g., hydroxystyrene, methoxystyrene, and cyanostyrene; the unsaturated alcohol esters such as vinyl acetate and vinyl propionate; the unsaturated ketones, e.g., vinyl methyl ketone and methyl isopropenyl ketone; the unsaturated ethers, e.g., vinylethyl ether and vinyl methyl ether; and the non-ionic derivatives of ethylenically unsaturated carboxylic acids such as acrylic esters, e.g, methyl acrylate, ethyl acrylate, butyl acrylate, hexyl acrylate, 2-ethylhexyl acrylate and lauryl acrylate; methacrylic esters, e.g., methyl methacrylate, ethyl methacrylate; the maleic esters such as dimethyl maleate, diethyl maleate and dibutyl maleate; the fumaric esters, e.g., dimethyl fumarate, diethyl fumarate and dibutyl fumarate, and the itaconic esters, e.g., dimethyl itaconate, diethyl itaconate and dibutyl itaconate; and the nitriles, e.g., acrylonitrile and methacrylonitrile. While not in the preferred class, non-ionic monomers containing halogens which are not activated may be employed, such as monochlorostyrene, dichlorostyrene, vinyl fluoride and chloroprene. Also non-ionic monomers which form water-soluble homopolymers, e.g., acrylamide, methacrylamide, hydroxyethyl acrylate and hydroxyethyl methacrylate, may be mixed with a hydrophobic monomer in small amounts up to about 10 percent, based on the amount of hydrophobic monomer.

By the term "pH independent groups" as applied to ionic groups is meant that the groups are predominantly in ionized form over a wide range in pH, e.g., 2–12.

By the term "non-ionic" as applied to the monomers in this specification is meant that the monomers are not ionic per se or do not become ionic by a simple change in pH. For illustration, while a monomer containing an amine group is non-ionic at high pH, the addition of a water-soluble acid reduces the pH and forms a water-soluble salt; hence, such a monomer is not included.

In carrying out the polymerization of the activated-halogen monomer with those embodiments in which it is desired not to have activated-halogens in the interior of the particle, the ratio of monomer to total polymer in the latex should be kept low at any given time during the process so as to avoid unduly swelling the existing latex particles. with too much swelling, i.e., too much monomer dissolved in the polymer, some polymerization may occur in the interior of the particle. With that occurrence, the reactive halogens are buried in the particle. The activated-halogen monomer is added to the starting latex over a short period or is added as a shot in one or more increments. Optionally, but preferably a hydrophobic monomer devoid of an activated-halogen or a mixture of such monomers also is added, usually in admixture with the activated-halogen monomer. The polymerization is advantageously carried out at as low a temperature as will provide a practical polymerization rate in order to avoid hydrolyzing the activated-halogen monomer. Such temperatures range from about 0° C to about 80° C, preferably from about 50° C to about 70° C. Unless the starting latex is prepared in situ, an initiator system (catalyst) is added to activate the latex particle surface, i.e., set up a steady state concentration of free-radicals. Continued addition of the initiator system after the addition of monomers can be carried out, if desired—especially when a redox system is used. The polymerization reaction is continued until the monomers are substantially completely copolymerized.

The product obtained by the above-described method is a latex of which the colloidally dispersed polymer particles, having a particle size of from about 500 Angstroms to about 10,000 Angstroms, consist of the starting latex particles encapsulated with a bound layer having a thickness of from a monomolecular layer of the copolymer to about 100 Angstroms, the layer consisting of a functional polymer with activated-halogen groups on the outer surface thereof.

The activated-halogen copolymer latexes are prepared under substantially the same conditions except for the reference to polymerization in the interior of the particle.

The amount of activated-halogen monomer copolymerized in the encapsulating layer of the structured-particle latex ranges from about 0.01 milliequivalent to about 1.4 milliequivalent, preferably from about 0.04 milliequivalent to about 0.5 milliequivalent, per gram of total polymer in the latex. However, there must be a sufficient amount of the hydrophobic monomer copolymerized with the activated-halogen monomer so that for each gram of polymer in the encapsulating layer, i.e., the cap, there is not more than 3.0 milliequivalents of the copolymerized activated-halogen monomer. The proportion of activated-halogen monomer is inversely related to the particle-size of the latex being encapsulated and also is inversely related to the molecular cross-sectional area of the activated-halogen monomer. Thus, one would not use the minimum amount of activated-halogen monomer with a starting latex of the smallest particle size. The amount of activated-halogen in such copolymers should not exceed about 3.0 meq/g. Since the rate of reaction of the activated-halogens at or near the surface of the particle in such copolymers is considerably faster than for halogens in the interior of the particle, kinetic data will show when the thin layer near the surface has reacted. With copolymers having higher amounts of activated-halogen monomer polymerized throughout the particle, swelling of the particle occurs as the nucleophile reacts, further reaction within the particle can occur rather readily, controlling the reaction to attain a structured-particle is difficult and the same advantageous results are not obtained.

The initiators used in the polymerization of the activated-halogen monomers are of the type which produce free-radicals and conveniently are per-oxygen compounds, for example: the inorganic peroxides such as hydrogen peroxide; the organic hydroperoxides such as cumene hydroperoxide and t-butyl hydroperoxide; the organic peroxides such as benzoyl peroxide, acetyl peroxide, lauroyl peroxide, peracetic acid and perbenzoic acid—sometimes activated by water-soluble reducing agents such as a ferrous compound, sodium bisulfite or hydroxylamine hydrochloride—and other free-radical producing materials such as 2,2'-azobisisobutyronitrile.

The organic hydroperoxides and 2,2'-azobisisobutyronitrile are preferred.

The surfactants which are used, either in the starting latex or as additives for further stabilization of the latex products, are cationic surfactants or non-ionic surfactants or mixtures thereof.

The cationic surfactants include the classes of salts of aliphatic amines, especially the fatty amines, quaternary ammonium salts and hydrates, fatty amides derived from disubstituted diamines, fatty chain derivatives of pyridinium compounds, ethylene oxide condensation products of fatty amines, sulfonium compounds, isothiouronium compounds, quinolinium compounds, isoquinolinium compounds, and phosphonium compounds. Specific examples of the cationic surfactants are dodecylamine acetate, dodecylamine hydrochloride, tetradecylamine hydrochloride, hexadecylamine acetate, lauryl dimethylamine citrate, octadecylamine sulfate, dodecylamine lactate, cetyl trimethyl ammonium bromide, cetyl pyridinium chloride, an ethanolated alkyl guanidine amine complex, stearyl dimethyl benzyl ammonium chloride, cetyl dimethyl benzyl ammonium chloride, tetradecylpyridinium bromide, diisobutyl phenoxy ethoxy ethyl dimethyl benzyl ammonium chloride, 1-(2-hydroxyethyl)-2-(mixed pentadecyl and heptadecyl)-2-imidazoline, resin amine ethoxylate, oleyl imidazoline, octadecyl ethylmethyl sulfonium methyl sulfate, dodecyl-bis-β-hydroxyethylsulfonium acetate, dodecylbenzyldimethylsulfonium chloride, dedecylbenzyltrimethylphosphonium chloride, S-p-dodecylbenzyl-N,N,N',N'-tetramethylisothiouronium chloride, N-laurylisoquinolinium bromide, N-dodecylquinolinium chloride, N-(4-dodecylbenzyl)-quinolinium chloride, N-octadecylisoquinolinium chloride and the like.

Typical non-ionic emulsifiers (surfactants) are compounds formed by the reaction of an alkylene oxide, such as ethylene oxide, propylene oxide, or butylene oxide with long chain fatty alcohols, long chain fatty acids, alkylated phenols, long chain alkyl mercaptans, long chain alkyl primary amines, for example, cetylamine, the alkylene oxides being reacted in a ratio of such as 5 moles to 20 moles or higher such as up to 50 moles per mole of the co-reactant. Similarly effective compounds are monoesters such as the reaction products of a polyethylene glycol with a long chain fatty acid, for example, glycerol monostearate, sorbitan trioleate, and partial and complete esters of long chain carboxylic acids with polyglycol ethers of polyhydric alcohols. By "long chain" in the above description is meant an aliphatic group having from six carbon atoms to 20 or more.

The preferred surfactants are surfactants having pH independent cationic groups and especially preferred are the fugitive surfactants such as cationic surfactants in which the cationic group is sulfonium, sulfoxonium, isothiouronium or a reducible quaternary nitrogen group, e.g., pyridinium, isoquinolinium and quinolinium.

For each active halogen which is reacted with a non-ionic nucleophile, one charge which is bound to the polymer is produced and one halide ion is released. In the reaction of a nucleophile with an activated-halogen, structured-particle latex or with a latex having activated-halogens distributed throughout the latex particle, the amount of halogen reacted is such as to provide from about 0.01 milliquivalent to about 0.5 milliequivalents of charge per gram of polymer. Preferably, the range is from about 0.04 milliequivalent to about 0.35 milliequivalent of charge per gram of polymer. However, in the thin, reacted layer near the surface of the particle, the amount of bound charge is from about 0.4 milliequivalent to about 2.5 milliequivalents for each gram of polymer in the layer.

The nucleophilic compounds which are suitable are non-ionic, carbon-containing nucleophiles which are stable in aqueous media and can diffuse through aqueous media having a hetero atom as the center of nucleophilicity, wherein all covalent bonds of said hetero atom are to a carbon atom.

The nucleophilic compounds which are used advantageously are represented by the following classes of compounds, sometimes called Lewis bases:
 a. monobasic, aromatic nitrogen compounds
 b. tetra (lower alkyl) thioureas
 c. $R_1-S-R_2$ wherein $R_1$ and $R_2$ individually are lower alkyl, hydroxy lower alkyl or wherein $R_1$ and $R_2$ are combined as one alkylene radical having 3 to 5 carbon atoms

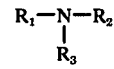

wherein $R_2$ and $R_3$ individually are lower alkyl or hydroxy lower alkyl, or are combined as one alkylene radical having 3 to 5 carbon atoms and $R_1$ is lower alkyl, aralkyl or aryl except when $R_2$ and $R_3$ together are an alkylene radical then $R_1$ is lower alkyl or hydroxy lower alkyl, and

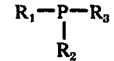

wherein $R_1$, $R_2$ and $R_3$ individually are lower alkyl, hydroxy lower alkyl or aryl.

In this specification the term lower alkyl means an alkyl having from 1 to 4 carbon atoms such as methyl, ethyl, propyl, isopropyl, n-butyl and isobutyl.

Representative specific nucleophilic compounds are pyridine, quinoline, isoquinoline, tetramethyl thiourea, tetraethyl thiourea, hydroxyethylmethyl sulfide, hydroxyethylethyl sulfide, dimethyl sulfide, diethyl sulfide, di-n-propyl sulfide, methyl-n-propyl sulfide, methylbutyl sulfide, dibutyl sulfide, dihydroxyethyl sulfide, bis-hydroxybutyl sulfide, trimethylene sulfide, thiacyclohexane, tetrahydrothiophene, N-methylpiperidine, N-ethylpyrrolidine, N-hydroxyethylpyrrolidine, trimethylphosphine, triethylphosphine, tri-n-butylphosphine, trimethylamine, tiethylamine, tri-n-propylamine, tri-isobutylamine, hydroxyethyldimethylamine, butyldimethylamine, tri-hydroxyethylamine, triphenylphosphorus, and N,N,N-dimethylphenethylamine.

In carrying out the reaction between the nucleophilic compound and the particles of latex having activated halogens chemically bound to the surface thereof, the latex is stirred gently while the nucleophilic compound is added thereto, as the compound per se or in the form of a solution. Gentle stirring may continue throughout the ensuing reaction, or optionally after dispersion of the compound in the latex, the stirring may be discontinued. The reaction is conveniently carried out at ambient temperature although temperatures from about 0° C to about 80° C can be used. The reaction occurs spontaneously at a rate which depends upon the reactivity of the activated halogen and of the nucleophile. It is preferred to carry out the reaction until a predominant proportion of the colloidal stability of the product is provided by the resulting chemically bound cationic groups. Usually a catalyst is not required although with the less reactive materials, a small amount of iodide ion may be used to facilitate the reaction. When a desired degree of reaction is reached, any excess nucleophile commonly is removed by standard methods, e.g., dialysis, vacuum stripping and steam distillation.

Other pH independent cationic groups can be substituted for cationic groups which are chemically bound to the latex particles according to the foregoing description by carrying out a further reaction with such cationic groups. For example, a cationic structured-particle latex having sulfonium groups chemically bound to the structured-particles at or near the particle surface can be reacted with hydrogen peroxide at a temperature of from about 20° C to about 80° C, preferably at ambient temperature, for a sufficient time to oxidize part or all of the sulfonium groups to sulfoxonium groups. Such treatment also reduces the odor of the latex. For best results in such an oxidation reaction, the hydrogen peroxide is used in excess, e.g., from 2 to 10 moles of hydrogen peroxide for each mole of sulfonium groups.

When the products are to be used in metal coating, it is preferred to react an activated-halogen latex containing only as much activated-halogen as is desired to be converted to bound charge. The activated-halogens are then fully converted to cationic groups and there is no bound activated-halogen in the product.

In some applications, the amounts of water soluble materials should be limited. The latexes having bound charges as herein described are highly advantageous for applications such as electrodeposition. Since a sufficient amount of charge is chemically bonded to the particle surface to provide colloidal stability, exhaustive dialysis or ion exchange can be used to remove water-soluble material from the latex or to substitute counter ions, if desired, while retaining cationic functionality and colloidal stability of the latex.

The particle size of the aqueous dispersion or latex, however obtained, is not critical to the electrodeposition process. However, the particle size (average diameter) usually is in the range of from about 500 Angstroms to about 10,000 Angstroms, preferably from about 800 Angstroms to about 5,000 Angstroms.

The process of this invention is used to coat any electroconductive surface, i.e., articles having an electroconductive surface. Examples of materials which furnish electroconductive surfaces are metals such as iron, steel, copper, aluminum, chromium, magnesium, tin, titanium, nickel, lead, zinc, or a metal alloy consisting of any of the aforesaid metals, conductive gels, conductive polymers and various forms of carbon such as graphite. Such materials can be in various forms or articles such as automobiles, wire, appliances, metal cans, siding, conductive paper and the like.

In the preferred embodiments of this invention a smooth, uniform, adherent, cross-linked, water insensitive coating is applied to the electroconductive surface.

The aqueous dispersions which are used in the electrocoating process are employed at a polymer concentration of from about 0.5 percent to about 50 percent by weight, preferably from about 2 percent to about 15 percent. For operability the process is essentially pH independent. For example, the process gives good electrodeposition performance with aqueous dispersions having a range of pH of from about 2 to about 12. Because of corrosion problems below a pH of 6, however, operation above a pH of 6 is preferred. A pH range of from about 6 to about 10 is especially preferred.

The aqueous dispersions, as formulated for the electrodeposition process, have a conductivity of from about 300 micromhos to about 3500 micromhos per centimeter, preferably from about 600 micromhos to about 1800 micromhos per centimeter, as measured at 25° C and 10 percent solids.

In carrying out the electrodeposition process of this invention, an electrophoretic cell is utilized. In the process, the surface to be coated becomes a cathode, another electrode becomes an anode, the latex composition comprises the coating bath and a source of electric current is required. During the process, the article to be coated can be positioned and maintained so that the surface to be coated is stationary within the coating bath or can be passed through a coating bath in a continuous manner. With direct current, the source is connected to the electrodes so that the current flows in such a direction as to maintain the article to be coated as the cathode and the other electrode as the anode in an electrophoretic system. The anode and the cathode may each be a single member or either or both may constitute a plurality of joined members. If desired the anode may be separated by a diaphragm from the polymer dispersion. Thus, the anode per se is in electrical contact, but not necessarily physical contact, with the aqueous polymer dispersion. In the use of direct current the anode preferably should be inert for this cationic electrodeposition system and can be the tank in which the process is carried out, for example, if the tank is of metal which is graphite-coated on the interior surfaces. If alternating current is used, then the charge on the electrodes alternates between positive and negative and a particular electrode becomes coated during the periods when it is negatively charged. During the electrodeposition, the electromotive force is applied in various ways:

1. constant source voltage which results in decreasing current as the electrodeposition proceeds;
2. constant current flow which requires increasing voltage as the process occurs;
3. constant cathode potential, and
4. pulse, i.e., high voltages for short, intermittent times.

The electromotive force which may be applied in the present process covers a wide range such as from about 10 volts to about 5,000 volts. With the first three of the above-listed methods of application, the applied potential generally is not greater than about 350 volts. With the fourth method of application, the potential used ranges from about 200 to about 5,000 volts, preferably to about 800 volts.

The coating bath conveniently is operated at ambient temperature, preferably from about 20° C to 35° C although temperatures from about 0° C to about 70° C or 80° C may be used.

In prior known electrocoating processes using aqueous dispersions of film-forming, organic polymers, supporting electrolytes ordinarily are not used. The presence of extraneous electrolyte is known to have a deleterious effect on such processes. However, to obtain optimum results in the practice of the present invention, certain types of water soluble inorganic salts are used to control conductivity. The salt concentration can affect film thickness, quantity of electricity used, efficiency (milligrams of coating deposited per coulomb), and appearance of the coating. Various kinds of salts may be used as supporting electrolytes. The anions of such salts may be selected from the same kinds which are suitable as the counterion for the bound cation required for the process. The cations of the supporting electrolyte salts should be selected so as not to interfere with the electrodeposition of the resin at the cathode. Undesirable cations include the alkali metal ions and calcium ions, which can be tolerated, however, at low concentrations, i.e., less than about 0.002 normal. In general, such undesirable ions have electrode potentials more negative than −2.40 volts as defined at pages 414 and 415, with values being listed from page 415 through page 426, of *The Encyclopedia of Electrochemistry*, Clifford A. Hampel, Editor, Reinhold Publishing Corporation, New York, 1964.

In the present process, a supporting electrolyte assists in some embodiments of the invention to improve efficiency. The addition of supporting electrolyte increases throwing power at constant pH. Such supporting electrolytes are water-soluble and may be used in small amounts such as up to about 0.1 normal based on the total volume of the aqueous dispersion of the coating bath. However, the amount used should not be sufficient to raise the conductivity of the aqueous dispersion above about 3500 micromhos per centimeter. Ammonium salts of weak acids, such as ammonium acetate, ammonium borate, ammonium carbonate, ammonium bicarbonate, and ammonium maleate, are preferred. Diammonium hydrogen phosphate has been found to be especially effective. In addition to their conductive contribution, the preferred salts also serve to buffer the aqueous medium and in general to assist in the deposition of smooth, adherent films.

The coating bath comprises the aqueous dispersion of polymer and various optional additives. Such additives include, for illustration, pH control agents, buffers and supporting electrolytes as referred to above and also such materials as dyes, pigments, fillers, agents for improved flow, and standard plasticizers and/or cross-linking systems for the particular polymer being electrodeposited. For some compositions it is particularly desirable to include a plasticizing solvent such as butyl acrylate, isoamyl acetate and 2-ethylhexanol to improve flow and to obtain very smooth coatings which are free of pinholes.

When the conducting surface of the article to be coated is maintained stationary in the coating bath, the flow of current stops, or becomes very low, when the article is coated. In such a process, the polymer coating ordinarily is deposited on the electroconductive surface within from about 10 seconds to about 2 minutes, although under the extremes of conditions, the deposition can be accomplished in one second or less. In the preferred embodiments, deposition occurs with rapid current cut off and is complete in less than 2 minutes. In electrodeposition processes in which the surface to be coated is passed through the coating bath in a continuous manner, such as in wire coating, the current does not cut off. During the electrodeposition process, it is advantageous that the coating bath should be circulated continuously.

The thickness of the film wich is electrodeposited ranges from about 0.5 mil to about 4 mils. The film, as deposited, is hydrophobic and is firmly adhered to the conductive substrate.

After electrodeposition, the coated articles are removed from the bath and other optional steps may be carried out. For example, the coated article, including the dragout, may be dried and optionally baked. Alternatively, the dragout may first be rinsed from the coated article with water, then the article may be dried and optionally baked. During baking, a slight amount of additional cross-linking may occur but further curing occurs if the polymeric constituent includes groups which provide cross-linking sites which are activatable by heat, e.g., residual ethylenic double bonds, such as from butadiene, which cross-link in the presence of oxygen and elevated temperature. As noted above, appropriate additives to induce subsequent cross-linking may be included in the coating bath.

The term "dragout" is applied to the polymer in the dispersed state which still adheres to a coated article when it is removed from the bath. Dragout includes the polymer such as would adhere when the article is merely dipped into the coating, and removed. In some embodiments, rinsing the dragout from the article with water is desired. This contrasts with the washing off of a poorly adhering but deposited coating, which would be undesirable.

For carrying out the electrodeposition of this invention, the structured-particle latexes in which the cationic groups chemically bound to the copolymer include isothiouronium, sulfonium, sulfoxonium and pyridinium groups are preferred. Such compositions undergo cathodic electrodeposition more readily to provide smooth, uniform coatings and simultaneously undergo irreversible charge destruction in the strongly reducing environment such as exists at a cathode surface while current is flowing in an electrolytic cell containing a conductive, aqueous medium. The structured-particle latexes having bound isothiouronium groups are especially preferred since in the electrodeposition process they provide rapid current cut off to form highly cross-linked, unusually hydrophobic coatings. Quaternary ammonium groups and phosphonium groups provide some cross-linking but they tend to cut off the current more slowly and cause gassing, heatup of the bath, and bubbling of the deposited coating.

The exact nature of the simulataneous cross-linking which occurs during cathodic electrodeposition according to the process of this invention is not completely understood. However, there is some kind of relationship to the electrodeposition process since the latexes per se do not cross-link substantially when converted to coatings by conventional methods unless other curing systems are present.

For latexes having the same general composition and molecular weight of polymer, both the degree of cross-linking and the coating thickness increase with the charge density on the particle. Beyond a certain charge level, however, the polymer becomes so hydrophilic that it is water soluble. At this point, the behavior of the system changes abruptly and the water-soluble materials are not acceptable for the present process.

It is often desirable to add a small amount of a surfactant in which the hydrophilic component is a reducible cationic group both to improve the wetting of substrates by the coating composition and to assist in regulating the cross-linking during the electrodeposition process.

By electrodepositing structured-particle latexes according to the present process, higher-molecular weight coatings can be deposited to achieve desirable properties in the coating while at the same time it is possible to have a higher charge density on the latex particle surface in order to obtain thicker coatings without simultaneously increasing the cross-linking to an undesirable degree. The fraction of the paticles containing little or no bound charge (the particle core) is deposited without crosslinking, thus in heat flowable condition, for optimal subsequent curing in a conventional manner while the thin outer layer of the particle cross-links during electrodeposition to form a matrix of cross-linked polymer.

Some of the advantages of the process of this invention are:

1. provides a controlled degree of cross-linking during electrodeposition thereby reducing or eliminating energy requirements for post curing;
2. provides for control of coating thickness;
3. raises the voltage at which rupture of the coating will occur with low molecular weight resins;
4. provides for improved pump stability in the coating bath.

Throughout this specification, all references to values for conductivity are values as measured at 25° C unless specifically indicated otherwise.

The following examples illustrate ways in which the present invention can be practiced, but should not be construed as limiting the invention. All parts and percentages are by weight unless otherwise expressly indicated. The particle sizes shown in the examples are average particle diameters obtained by light scattering measurements, except as indicated. The molecular weights shown in the examples are number average molecular weights as determined by gel permeation chromatography using a polystyrene calibration standard.

EXAMPLES 1–5

A thermoplastic acrylic latex is prepared in the following manner. A monomer mixture is prepared from 1072 grams of ethyl acrylate and 528 grams of methyl methacrylate and to this mixture is added 24 grams of dodecanethiol and 5 grams of an 82.7-percent solution of t-butyl hydroperoxide to form a monomer feed solution. A seed latex is prepared from 750 grams of a surfactant solution previously prepared by stirring 710 grams of water and 40.0 grams of a 25-percent-active solution of dodecylbenzyldimethylsulfonium chloride for 2 hours under a stream of nitrogen to which is then added 25 grams of the monomer feed solution, followed by a continuously-added reducing stream pumped for about 2 hours at a rate of 7.67 grams per hour, the stream being a portion of a solution previously prepared from 9 grams of hydroxylamine hydrochloride diluted to 500 grams with deionized water. To the seed latex is added monomer feed solution at a rate of 55 grams per hour with continuation of a reducing stream of the same rate of addition and composition as in the seed latex and concurrently pumping into the reaction mixture at the rate of 20 grams per hour a surfactant solution previously prepared from 400 grams of deionized water and 100 grams of a 25-percent-active solution of dodecylbenzyldimethylsulfonium chloride. After 20 hours the conversion is about 85 percent, the continuous additions are discontinued, 15 grams of vinylbenzyl chloride (1.35 percent based on total monomer weight) is added and the reaction is allowed to continue for an additional 2 hours. The temperature is maintained at 50° C throughout the reaction. There is obtained thereby a latex having a solids content of 47.6 percent, a pH of 2.8, a particle size of 1250 Angstroms, and containing a polymer having a molecular weight of 74,000 with a chloride ion content of 0.113 milliequivalent per gram of polymer.

A portion of the activated-halogen containing latex is diluted with water to a solids content of 23.8 percent, then 2.24 parts of dimethyl sulfide per 100 parts of the diluted latex are added with gentle stirring and the resulting mixture is allowed to stand at room temperature for 5 days. Latex 1 is obtained, which contains 0.237 milliequivalent of total charge per gram of polymer of which 0.124 milliequivalent is present from sulfonium groups bound to each gram of polymer in the latex.

Other latexes are prepared in the same manner except that different amounts of vinylbenzyl chloride are copolymerized as shown in Table I below. Since in some cases the amount of chain transfer agent, dodecanethiol, also differed, the amount used is shown in Table I.

TABLE I

| Latex No. | VBC$^a$ % | DDT$^b$ % | Polymer Molecular Weight | Particle size Angstroms |
|---|---|---|---|---|
| C-1 | 1.35 | 1.5 | 74,000 | 1250 |
| C-2 | 2.65 | 1.5 | 94,000 | 1370 |
| C-3 | 3.5 | 1.5 | 73,000 | 1310 |
| C-4 | 3.5 | 0.7 | 103,000 | 1430 |
| C-5 | 3.5 | 0.0 | 165,000 | 1390 |

$^a$vinylbenzyl chloride, based on total monomer
$^b$dodecanethiol, based on total monomer Portions of Latexes C-2 – C-5 are reacted by use of an excess of dimethyl sulfide as described for Latex C-1. Latexes 1–5, i.e., the resulting latexes containing bound sulfonium groups, are dialyzed exhaustively to remove adsorbed soap and other salts. Each of the latexes is formulated with 0.02 milliequivalent of dodecylbenzyldimethylsulfonium chloride per gram of solids and is diluted with water to a solids content of 10 percent.

The above-described formulations are used to coat metal panels by cathodic electrodeposition. For each series a rectangular polyethylene electrodeposition cell containing two graphite anodes of equal size located at the ends of the long axis are partially filled with 70 grams of latex. A rectangular sample, about ½ inch by 4 inches by 1/16 inch, of the indicated metal is immersed in the latex to a depth sufficient to provide 729 square millimeters of metal surface in contact with the latex halfway between the two anodes with the flat ½ inch by 4 inch plane normal to a straight line between the two anodes. A source of direct current at the indicated potential is connected individually to the two anodes and to each of the samples which functioned as the cathode. After 2 minutes, the residual current is measured, the potential source is disconnected and the sample is rinsed in a stream of deionized water. After drying, the coating weight and efficiency are determined. Except as otherwise shown, the results shown are the average of the two coated panels. The data for electrodeposition on zinc phosphated steel are shown in Table II and for electrodeposition on cold rolled steel are shown in Table III. The controls, C-1 to C-5 (the portions of the latexes which are not reacted with dimethylsulfide and thus not examples of the invention) are also dialyzed, then are formulated with sufficient additional dodecylbenzyldimethylsulfonium chloride to provide the same total milliequivalents of sulfonium groups per gram of polymer as the total from bound charges and adsorbed surfactant contained in the latex of the invention with which they are to be compared. These control latexes are diluted to the same solids content and electrodeposited in the same manner described for the comparable latex of the invention.

is used to electrodeposit a coating on a zinc phosphated steel panel as described for Examples 1–5 except that

TABLE II

Electrodeposition Zinc Phosphated Steel

| Latex | Sulfonium Groups Meq./g of solids | | Coating Weight mg/cm² | Efficiency mg/coul. | Insoluble[a] After Coating % |
|---|---|---|---|---|---|
| | Total | Bound | | | |
| 1 | 0.09 | 0.07 | 12.6 | 22.5 | 8 |
| *C-1 | 0.09 | 0.00 | 1.5 | 11.0 | 0 |
| 2 | 0.18 | 0.16 | 7.8 | 10.5 | 12 |
| *C-2 | 0.18 | 0.00 | 2.1 | 10.5 | 0 |
| 3 | 0.27 | 0.25 | 6.2 | 6.2 | 16 |
| *C-3 | 0.27 | 0.00 | 2.5 | 10.1 | 0 |
| 4 | 0.27 | 0.25 | 6.9 | 7.1 | 22 |
| *C-4 | 0.27 | 0.00 | 2.2 | 9.5 | 0 |
| 5 | 0.28 | 0.26 | 7.5 | 9.7 | 34 |
| *C-5 | 0.27 | 0.00 | 2.3 | 10.0 | 0 |

*not an example of the invention
[a] insolubility of coated polymer in methylethyl ketone. Before coating, all of the polymers are completely soluble in that solvent.

TABLE III

Electrodeposited on Cold Rolled Steel

| Latex | Sulfonium groups Meq./g of polymer | | Coating Weight mg/cm² | Efficiency mg/coul. | Insoluble[a] After Coating % |
|---|---|---|---|---|---|
| | Total | Bound | | | |
| 1 | 0.09 | 0.07 | 11.8 | 19.0 | 9 |
| *C-1 | 0.09 | 0.00 | 1.8 | 9.3 | 0 |
| 2 | 0.18 | 0.16 | 8.7 | 8.0 | 13 |
| *C-2 | 0.18 | 0.00 | 2.0 | 7.7 | 0 |
| 3 | 0.27 | 0.25 | 5.2 | 5.1 | 15 |
| *C-3 | 0.27 | 0.00 | 2.0 | 7.1 | 0 |
| 4 | 0.27 | 0.25 | 6.5 | 5.1 | 23 |
| *C-4 | 0.27 | 0.00 | 2.0 | 6.8 | 0 |
| 5 | 0.28 | 0.26 | 8.8 | 8.3 | 30 |
| *C-5 | 0.27 | 0.00 | 1.9 | 6.4 | 0 |

*not an example of the invention
[a] insolubility of coated polymer in methylethyl ketone. Before coating, all of the polymers are completely soluble in that solvent.

EXAMPLE 6

A latex is prepared as described in Example 1 except that 1 percent, based on the total monomer weight, of dodecanethiol is added as chain transfer agent and the monomer composition is 75 percent of butyl acrylate and 25 percent of vinylbenzyl chloride. A latex (Latex C-6) is obtained having a solids content of 45.1 percent, a particle size of 995 Angstroms and a copolymer molecular weight of 60,000. A portion of that latex is dialyzed and then reacted for four days with 2 milliequivalents of dimethyl sulfide per gram of solids. The remaining dimethyl sulfide is removed by vacuum stripping. The resulting latex (Latex 6) has a solids content of 25.5 percent and contains 0.22 milliequivalent of sulfonium group per gram of polymer of which 0.162 milliequivalent is chemically bound to the polymer. That amount of bound sulfonium group indicates that about 10 percent of the copolymerized vinylbenzyl chloride groups are converted to sulfonium groups. A portion of the latex is formulated with 0.1 milliequivalent of diammonium hydrogen phosphate per gram of polymer and the solids content is adjusted to 10 percent and the pH to 7.5. The resulting formulated latex is used to electrodeposit a coating on a zinc phosphated steel panel as described for Examples 1–5 except that the voltage is 350 volts. The efficiency is found to be 16.1 milligrams per coulomb and the coating weight is 4.2 milligrams per square centimeter. The coating is baked at 175° C for 20 minutes and is found to be smooth and uniform in appearance.

EXAMPLES 7–9

A latex is prepared in a batch recipe by an emulsion polymerization reaction of 40 parts of styrene and 55 parts of butyl acrylate in 300 parts of water using 0.2 part of dodecanethiol, 2 parts of azobisisobutyronitrile and 5 parts of dodecylbenzyldimethylsulfonium chloride with stirring for 17 hours at 50° C and 1 hour at 70° C to provide a monomer conversion of about 90 percent, then 5 parts of 2-bromoethyl methacrylate is added and the same reaction conditions are maintained for an additional 2 hours. After the reactor is vented and cooled, the product is found to be a fluid latex (Latex C-7) having a solids content of 25.7 percent and a particle size of 1070 Angstroms.

The nucleophiles as shown in Table IV are mixed with separate portions of Latex C-7 and the resultant mixtures are allowed to stand at 25° C for the time shown in the table.

TABLE IV

| Example No. | Nucleophile | | Reaction Time days | Charge[b] | |
|---|---|---|---|---|---|
| | Kind | Amount[a] | | Total | Bound |
| 7 | Dimethyl sulfide | 0.52 | 17 | 0.16 | 0.06 |
| 8 | Trimethylamine | 0.52 | 10 | 0.22 | 0.10 |

TABLE IV-continued

| Example No. | Nucleophile Kind | Amount[a] | Reaction Time days | Charge[b] Total | Bound |
|---|---|---|---|---|---|
| 9 | Tetramethylthiourea | 0.29 | 4 | 0.27 | 0.15 |

[a] meq/g based on polymer in starting latex
[b] meq/g based on polymer in product latex Control Latex C-7 and Latexes 7–9 are mixed with water and 2-ethylhexanol to reduce the solids content to 10 percent, the amount of the 2-ethylhexanol being equal to 10 percent of the total weight of solids in the diluted latex. To the diluted latexes is added sufficient diammonium hydrogen phosphate to adjust the conductivity to 1500 micromhos per centimeter. Each of the latexes is electrodeposited on zinc phosphated steel panels at 200 volts for 30 seconds as described in Example 1 except that larger panels are used, 2¾ inches by 5⅞ inches by 1/16 inch, which are immersed in the latex to a depth sufficient to provide 10,000 square millimeters of metal surface in contact with the latex. Data are shown in Table V.

TABLE V

| Latex | pH | Coating Thickness mils | Appearance |
|---|---|---|---|
| 7 | 7.9 | 0.40 | Slightly uneven |
| 8 | 8.3 | 1.9 | Rough |
| 9 | 7.5 | 0.32 | Dull, uniform |
| *[a]C-7 | 7.8 | 0.38 | Dull, uniform |

*=Not an example of the invention
[a] Sufficient dodecylbenzyldimethylsulfonium chloride added to increase the total charge to 0.22 milliequivalent per gram of polymer.

In a test of tackiness of the coating by pressing a piece of facial tissue onto the coating, removing the tissue and observing the coating for fiber pulled from the tissue, no fibers are found on the coatings from Latex 7 and Latex 9 but some fibers are found on the coating from Latex 8 and more are found on the coating from Latex C-7. These results indicate that some cross-linking has occurred in the coating from Latex 8 but more cross-linking had occurred in the coatings from Latex 7 and Latex 9. During the electrodepositions it is observed that the current does not cut off as rapidly with Latex 8.

EXAMPLES 10–12

A latex is prepared by an emulsion polymerization reaction of 40 parts of styrene, 55 parts of butyl acrylate in 300 parts of water using 0.2 part of dodecanethiol, 2 parts of azobisisobutyronitrile, and 4 parts of dodecylbenzyldimethylsulfonium chloride with stirring for 18 hours at 50° C and 2 hours at 70° C to provide a monomer conversion of about 90 percent, then 5 parts of 2-chloromethylbutadiene is added and the same reaction conditions are maintained for an additional 2 hours. After the reactor is vented and cooled, the product is found to be a fluid latex (Latex C-10) having a solids content of 24.3 percent and a particle size of 1450 Angstroms.

The nucleophiles as shown in Table VI are mixed with separate portions of Latex C-10 and the resultant mixtures are allowed to stand at 35° C for the time shown in the table.

TABLE VI

| Example No. | Nucleophile Kind | Amount[a] | Reaction time Days | Charge[b] Total | Bound |
|---|---|---|---|---|---|
| 10 | Thiophane | 0.80 | 4 | 0.402 | 0.265 |
| 11 | Trimethylamine | 0.50 | 4 | 0.342 | 0.205 |
| 12 | Tetramethylthiourea | 0.50 | 4 | 0.535 | 0.398 |

[a] meq/g based on polymer in starting latex
[b] meq/g based on polymer in product latex Control Latex C-10 and Latexes 10–12 are formulated in the same manner and are electrodeposited in the same manner as described in Examples 7–9 except that for Latex 11 only the deposition time is 10 seconds. Data are shown in Table VII.

TABLE VII

| Latex | Coating Thickness mils |
|---|---|
| 10 | 0.65 |
| 11 | 1.45 |
| 12 | 0.46 |
| *C-10 | 0.40 |

*Not an example of the invention

From the pick test as described for Examples 7–9, the coatings from Latex 10 and Latex 12 are found to be non-tacky, (cross-linked) whereas the coating from Latex 11 is somewhat tacky (less cross-linking) and the coating from Latex C-10 is still more tacky. During electrodeposition of Latex 11, the current cuts off slowly giving high film build.

EXAMPLE 13

A latex is prepared by an emulsion polymerization reaction of 50 parts of methyl methacrylate and 45 parts of butylacrylate in 300 parts of water using 0.2 part of dodecanethiol, 2 parts of azobisisobutyronitrile and 4 parts of dodecylbenzyldimethylsulfonium chloride with stirring for 16 hours at 50° C and 3 hours at 70° C to provide a monomer conversion of about 90 percent, then 5 parts of vinyl bromide is added and the same reaction conditions are maintained for an additional 2 hours. After the reactor is vented and cooled, the product is found to be a fluid latex (Latex C-13) having a solids content of 23.8 percent and a particle size of 1490 Angstroms.

With a portion of Latex C-13 is mixed 0.52 milliequivalent of tetramethylthiourea for each gram of polymer in the latex portion and the resulting mixture is allowed to stand at 25° C for 7 days. The latex product (Latex 13) has a total charge of 0.28 milliequivalent and a bound charge of 0.20 milliequivalent for each gram of polymer in the latex.

Latex 13 is formulated and electrodeposited in the same manner as in Examples 7–9. A non-tacky, cross-linked coating which is smooth and uniform, having a thickness of 0.31 mil, is thereby deposited on the metal panel.

EXAMPLE 14

Into a 2-gallon, glass-lined Pfaudler kettle fitted with a crowfoot agitator are loaded at room temperature, 150 parts of water, 1 part (active basis) of dodecylbenzyldimethylsulfonium chloride, 2 parts of 2,2'-azobisisobutyronitrile, and 0.1 part of dodecanethiol, the stirrer is started, the reactor is closed and the system is purged four times with nitrogen. Styrene (33 parts), butadiene (50 parts) and 2-hydroxyethyl acrylate (2 parts) are forced into the reactor by pressure and the reactor contents are heated to 50° C and held at that temperature for 17 hours. The temperature then is raised to 70° C and the reaction is allowed to continue for ½ hour, at which time the conversion is about 75 percent. Vinylbenzyl chloride monomer (15 parts) is added to the reactor and stirring at a temperature of 70° C is continued for 3½ hours. The product is then cooled and removed from the reactor.

A latex is obtained having a solids content of 39.0 percent and a particle size of 1250 Angstroms. The latex is vacuum stripped, and sufficient dodecylbenzyldimethylsulfonium chloride is added to raise the total amount to 0.05 milliequivalent per gram of polymer. The resulting latex is diluted with water to a solids content of 20 percent. The resulting latex is mixed with 0.11 milliequivalent of pyridine per gram of solids and reaction is continued for 10 days at room temperature. The latex product is then vacuum stripped, filtered, formulated with diammonium hydrogen phosphate to adjust the conductivity to 1560 micromhos per centimeter and diluted to a solids content of 10 percent. The formulated latex, having the pH adjusted to 7.0, is electrodeposited in the same manner as in Examples 7–9. A non-tacky, cross-linked, fine-textured, smooth, uniform, adherent coating having a thickness of 2.0 mils is thereby deposited on the metal panel. There is no evidence of flow while heating the coated panel at 175° C for 20 minutes.

That which is claimed is:

1. A method for applying a cross-linked coating to an object having an electroconductive surface comprising the steps of
   1. immersing the object in a coating bath comprising a latex of cationic structured particles of a film-forming polymer consisting of a nonionic, organic polymer core encapsulated by a thin layer of a water-insoluble, organic polymer having pH independent cationic groups chemically bound to the organic polymer at or near the particle surface;
   2. passing an electric current through said coating bath sufficient to deposit and to cross-link a coating of said structured particles of polymer on the object by providing a difference of electrical potential between the object and an electrode that is
      a. spaced apart from said object
      b. in electrical contact with said coating bath; and
      c. electrically positive in relation to said object;
   said coating bath having a conductivity of from about 300 micromhos to about 3500 micromhos per centimeter measured at 25° C.
2. The method of claim 1 in which the current is direct current.
3. The method of claim 1 in which the cationic group is a sulfonium group, a sulfoxonium group, a pH independent isothiouronium group or a pyridinium group.
4. The method of claim 3 in which the cationic group is an isothiouronium group.
5. The method of claim 1 in which the nonionic, organic polymer core is devoid of activated-halogen atoms.
6. The method of claim 1 in which the nonionic, organic polymer core is an emulsion polymer.
7. The method of claim 1 in which the latex contains a small amount of a cationic surfactant.
8. The method of claim 1 in which the conductivity of the coating bath is from about 600 micromhos to about 1800 micromhos per centimeter, measured at 25° C.
9. The method of claim 1 in which the cationic groups chemically bound to the organic polymer are present in an amount from about 0.01 milliequivalent to about 0.5 milliequivalent per gram of polymer in the latex and said amount also is from about 0.4 milliequivalent to about 2.5 milliequivalents for each gram of polymer in the thin layer.
10. The method of claim 1 in which the amount of the cationic groups chemically bound to the organic polymer is from 0.04 milliequivalent to about 0.35 milliequivalent per gram of polymer in the latex.

* * * * *